United States Patent

Uematsu

[11] Patent Number: 4,703,134
[45] Date of Patent: Oct. 27, 1987

[54] WATER IMPERVIOUS RUBBER OR PLASTIC INSULATED POWER CABLE

[75] Inventor: Tadayuki Uematsu, Chiba, Japan

[73] Assignee: Furukawa Electric Co., Ltd., Tokyo, Japan

[21] Appl. No.: 884,010

[22] Filed: Jul. 10, 1986

[30] Foreign Application Priority Data

Jul. 23, 1985 [JP] Japan .................. 60-112591[U]

[51] Int. Cl.$^4$ ............................... H01B 7/28
[52] U.S. Cl. .................. 174/106 SC; 174/106 R; 174/107
[58] Field of Search ............ 174/102 SC, 105 SC, 174/106 SC, 107, 106 R

[56] References Cited

U.S. PATENT DOCUMENTS

| | | | |
|---|---|---|---|
| 2,948,772 | 8/1960 | Bopp | 174/107 |
| 4,020,276 | 4/1977 | Maingueneau | 174/107 X |
| 4,042,776 | 8/1977 | Matsuba et al. | 174/107 X |
| 4,145,567 | 3/1979 | Bahder et al. | 174/107 |
| 4,256,921 | 3/1981 | Bahder | 174/102 SC X |
| 4,472,597 | 9/1984 | Uematsu | 174/106 SC |
| 4,501,928 | 2/1985 | Ishitobi | 174/106 SC X |
| 4,626,619 | 12/1986 | Uematsu | 174/106 SC |

FOREIGN PATENT DOCUMENTS

| | | | |
|---|---|---|---|
| 63378 | 4/1945 | Denmark | 174/107 |
| 2508928 | 9/1976 | Fed. Rep. of Germany | 174/107 |
| 2807767 | 8/1979 | Fed. Rep. of Germany | 174/107 |
| 2832529 | 2/1980 | Fed. Rep. of Germany | 174/106 R |
| 2514189 | 10/1981 | France | 174/109 |
| 69110 | 4/1982 | Japan | |
| 311 | 1/1983 | Japan | |
| 1375677 | 11/1974 | United Kingdom | 174/107 |

Primary Examiner—Morris H. Nimmo
Attorney, Agent, or Firm—Frishauf, Holtz, Goodman & Woodward

[57] ABSTRACT

In a water impervious rubber or plastic insulated power cable of the invention having a water impervious layer of a laminated tape comprising a metal foil and an electrically conductive plastic film formed directly around a cable core or through another coating layer, a hold tape layer having an excellent expanding property to follow a heat cycle of the power cable is formed on the water impervious layer.

16 Claims, 4 Drawing Figures

WATER IMPERVIOUS RUBBER OR PLASTIC INSULATED POWER CABLE

BACKGROUND OF THE INVENTION

The present invention relates to an improved water impervious rubber or plastic insulated power cable.

A typical water impervious rubber or plastic insulated power cable has a structure wherein a water impervious layer comprising a metal-plastic laminated tape, a hold tape layer, and a metal shield layer are sequentially formed on a cable core. The cable core has a conductor shield, a rubber or plastic insulation layer, and an insulation shield which are formed on a conductor. Crosslinked polyethylene, an ethylene-propylene rubber, and the like are mainly used as the insulation layer in water impervious rubber or plastic insulated power cables having such a structure. Laminated tapes comprising lead or a lead alloy and polyolefin are mainly used as plastic laminated tapes constituting water impervious layers since they have excellent flexibility and chemical resistance. In addition, semiconductive cloth tapes are generally used as hold tapes applied on water impervious layers. A semiconductive cloth tape is obtained by friction-treating a woven fabric with electrically conductive rubber. The warps and wefts of the woven fabric are, in general, cotton yarn, viscose rayon yarn, acetate yarn, vinylon yarn, nylon yarn, or polyester yarn.

In the manufacture of water impervious rubber or plastic insulated power cables having the above conventional structure, a laminated tape comprising a metal foil and a plastic film is longitudinally applied on the cable core. After a hold tape is wound on the laminated tape, heating is performed to bond the laminated tape to the cable core, thereby forming a water impervious layer. In this case, the adhesive strength between the laminated tape and the cable core is largely influenced by the temperature and time during heating. That is, the higher the heating temperature and heating time, the higher the adhesive strength obtained.

A water impervious rubber or plastic insulated power cable manufactured in the manner described above, however, has the following problems.

A semiconductive cloth tape normally used as a hold tape on a conventional water impervious layer has a memory rate of expansion and contraction of 0 to 15%. Therefore, when a water impervious rubber or plastic insulated power cable having a hold tape constituted by such a tape is subjected to repeated bending, the water impervious tape cracks along the edge of the hold tape layer.

When the cable is subjected to a heat cycle of 130° C.⇌R.T. (Room Temperature) with power applied to the conductor, as the cable core expands or contracts, the water impervious layer comprising a metal-plastic laminated tape bonded on the core also expands or contracts. However, the hold tape on the water impervious layer, once expanded, cannot contract. Therefore, when other layers expand and then contract, the hold tape layer forms wrinkles. Such wrinkles in the hold tape layer cause damage to the water impervious layer formed within the hold tape layer and/or the metal shield layer formed around the hold tape layer, thereby significantly degrading the characteristics of the cable.

The memory rate of expansion and contraction, which represents the degree of contraction of a yarn is an index for stretchability of a fabric of the yarn, and is calculated in accordance with JIS (Japanese Industrial Standard) L 1090 by the following equation:

Memory rate of expansion and contraction $A(\%) = (a-b)/a \times 100$ where, $a$ = hank (mm) in the case of applying a load of 2/1000 gf×20 number per 1d of the indicated denier and another load of 1/10 gf×20 number per 1d of the indicated denier; and $b$ = hank (mm) in the case of applying a load of 2/1000 gf×20 number per 1d of the indicated denier.

SUMMARY OF THE INVENTION

In view of the fact as described above for a water impervious rubber or plastic insulated power cable, extensive studies have been made and it has been found that the above problems can be effectively solved by using, as a hold tape layer, a tape having an excellent expansion property, capable of following the heat cycle of the cable. Based on this finding, an improved water impervious rubber or plastic insulated power cable has been obtained by using, as a tape having such a characteristic, an electrically conductive tape obtained by forming an electrically conductive rubber layer on at least one side of a woven fabric in which the warps or wefts or both have an excellent memory rate of expansion and contraction, preferably 30% or more, and which, therefore, has a memory rate of expansion and contraction of at least 30% in the transverse or longitudinal or both directions.

DETAILED DESCRIPTION OF THE PREFERRED EMBODIMENT

Figure 1:
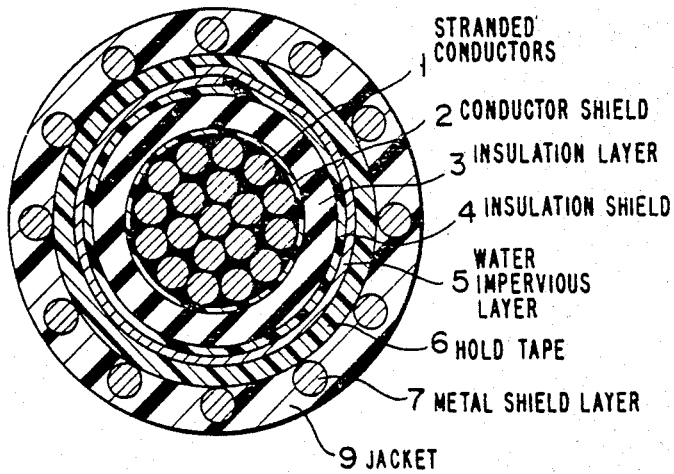
FIG. 1 is a sectional view showing an example of a cable construction according to the present invention.

According to the present invention, an electrically conductive tape using as a base cloth a woven fabric obtained by weaving a yarn having a memory rate of expansion and contraction of 30% or more is used as a hold tape formed on a water impervious layer. Therefore, the hold tape can follow the movement of the cable core, and therefore does not cause twisting or shifting or forming of wrinkles.

The effect of this hold tape layer is further enhanced when a lubricant such as silicone resin, graphite powder, talc, paraffin, hydrocarbon resin, fatty amide, fatty ester, carbon powder, or a stearate is applied on the surface of this electrically conductive tape.

In order to impart good characteristics to a cable, a yarn having a memory rate of expansion and contraction of 40% or more is used for the woven fabric, and wefts have a larger elongation than warps. The weaving method can be plain weaving, diagonal weaving, or twill weaving.

As the material for the yarn, a synthetic resin material having a low hygroscopicity is preferable. Preferred examples of such resin materials may include nylon, polyester, polybutylene terephthalate, polyurethane, and polypropylene.

As a yarn having a memory rate of expansion and contraction of 30% or more by crimping, wooly tetron, wooly nylon, and P.B.T. fiber ("Samora" available from Toray Industries, Inc.) are commercially available. As an electrically conductive rubber to be formed on at least one side of a woven fabric as a base material for a hold tape, an electrically conductive compound obtained by drying a solvent solution of a mixture of butyl rubber as a base and an electrically conductive carbon black such as "Ketjenblack EC" (trade name of AKZO Co.) or acetylene black and by vulcanizing the mixture by heating is used. The electrically conductive tape forming the hold tape has a volume resistivity of $5 \times 10^6$ Ω·cm or less.

When at least one side of the electrically conductive rubber layer formed on the semiconductive woven fabric is subjected to a smoothening treatment by topping or the like, better results are obtained in respect to stress relaxation in and prevention of external damage to the water impervious layer.

In the water impervious rubber or plastic insulated power cable according to the present invention, the water impervious layer formed under the hold tape layer comprises a laminated tape comprising a metal foil of lead, copper, aluminum or the like, 20 to 200 μm in thick, and an electrically conductive plastic film having a thickness of 20 to 200 μm and a volume resistivity of $10^6$ Ω·cm or less. A copper wire or copper tape is used for a metal shield layer to be formed around the hold tape layer. A laminated tape using a lead or lead alloy foil is most preferred since it is flexible to provide excellent formability and can impart excellent chemical resistance to the cable.

Crosslinked polyethylene, polyethylene, ethylene-propylene rubber or the like is used for the insulation layer. Although a stranded conductor is normally used as a conductor, in applications where water infiltration from the conductor side is feared and must be prevented, a watertight conductor obtained by filling the gaps between the strands with an electrically conductive watertight compound is used. Although the electrically conductive watertight compound is not limited to a particular type, a mixture (developed by the present inventors) comprising 100 parts of butyl rubber (trade name: polysar-butyl), 10 to 30 parts of conductive carbon black (trade name: Ketjenblack EC), and 100 to 200 parts of calcium carbonate, and having a volume resistivity of $10^6$ Ω·cm or less is preferable due to its excellent filling and other properties.

In a water impervious rubber or plastic insulated power cable according to the present invention, since no wrinkles are formed in the hold tape layer, the inner water impervious layer and the outer metal shield layer are not adversely affected and the cable can exhibit excellent characteristics over a long period of time, thereby providing excellent industrial effects.

EXAMPLES 1–4/COMPARATIVE EXAMPLES 1–4

Figure 1A:
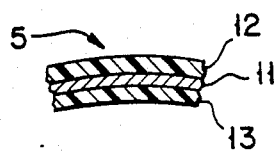
FIG. 1A shows a fragmentary cross-sectional view of a water impervious layer of FIG. 1.
Figure 1B:
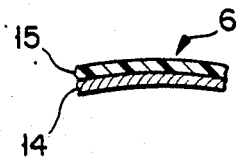
FIG. 1B shows a fragmentary cross-sectional view of a hold tape of FIG. 1.

In each of Examples 1 to 4 and Comparative Examples 1 to 4, as shown in FIG. 1, each watertight conductor had stranded conductors 1 of 500 mm² area which were filled with an electrically conductive watertight compound (volume resistivity: $5 \times 10^2$ Ω·cm) consisting of 100 parts of butyl rubber (polysar-butyl), 25 parts of conductive carbon black (Ketjenblack EC), and 100 parts of calcium carbonate. Conductor shield 2 consisting of ethylene-ethyl acrylate copolymer (EEA) and electrically conductive carbon, insulation layer 3 of crosslinked polyethylene, and insulation shield 4 consisting of EEA and electrically conductive carbon were formed around the watertight conductor to provide a cable core. After the cable core was dried at 60° C. to make the amount of methane gas 0.2 cc or less per cc of the crosslinked polyethylene, a water impervious tape was longitudinally applied around the cable core to form water impervious layer 5. The water impervious tape forming layer 5 was as shown in FIG. 1A, a 50 μm-thick lead foil 11 laminated on both sides with 100 μm-thick adhesive EEA films 12, 13. Hold tape 6 of each material shown in Table 1 below was wound around the resultant structure with a ½ lap. Metal shield layer 7 comprising a copper wire having a diameter of 1.2 mm were formed. Jacket 9 of polyvinyl chloride was formed as an outermost layer to provide 66 kV water impervious crosslinked polyethylene insulated power cable. FIG. 1B shows a typical hold tape 6 comprising a woven fabric layer 14 with an electrically conductive rubber layer 15 is formed on one side thereof.

TABLE 1

|  | | Material | Memory Rate (%) of Expansion and Contraction for Yarn | Weaving Method | Memory Rate (%) of Expansion and Contraction for Woven Fabric | Volume Resistivity (Ω · cm) of Hold Tape |
|---|---|---|---|---|---|---|
| Example 1 | Warp | Nylon 6 | 20 | Plain weave | 15 | $1 \times 10^4$ |
|  | Weft | Nylon 6 stretched yarn with crimps | 50 |  | 50 |  |
| Example 2 | A thermosetting silicone resin layer (amount applied: 1.0 g/m²) was formed on one surface of a hold tape of Example 1. | | | | | $1 \times 10^4$ |
| Example 3 | A thermosetting silicone resin layer (amount applied: 0.5 g/m²) was formed in addition to an electrically conductive butyl rubber layer of a hold tape of Example 2. | | | | | $1 \times 10^5$ |
| Example 4 | Talc was applied as a lubricant on an electrically conductive butyl rubber layer of a hold tape of Example 2. | | | | | $3 \times 10^4$ |
| Comparative Example 1 | Warp | Nylon 6 filament | 20 | Plain weave | 15 | $1 \times 10^4$ |
|  | Weft | Nylon 6 filament | 20 |  | 15 |  |
| Comparative | Warp | Polyester filament | 25 | Plain weave | 20 | $5 \times 10^4$ |

TABLE 1-continued

| | | Material | Memory Rate (%) of Expansion and Contraction for Yarn | Weaving Method | Memory Rate (%) of Expansion and Contraction for Woven Fabric | Volume Resistivity ($\Omega \cdot$ cm) of Hold Tape |
|---|---|---|---|---|---|---|
| Example 2 | Weft | Polyester filament | 25 | | 20 | |
| Comparative Example 3 | Warp | Polyester filament | 25 | Plain weave | 20 | $1 \times 10^4$ |
| | Weft | Polybutylene-terephthalate filament | 25 | | 20 | |
| Comparative Example 4 | Warp | Polyester filament | 25 | Twill weave | 25 | $5 \times 10^4$ |
| | Weft | Polyester filament | 25 | | 28 | |

Note 1.
Each hold tape was made by applying a semiconductive butyl rubber compound solvent solution on both sides of a woven fabric, drying the fabric, and heating and vulcanizing it to impart electrical conductivity.
Note 2.
Tapes in Examples 2, 3 and 4 were obtained by treating tapes as in Example 1.

EXAMPLES 5–7

In each of Examples 5 to 7, a watertight stranded conductor, 500 mm² in cross-sectional area, filled with an electrically conductive watertight compound (volume resistivity: $1 \times 10^4$ $\Omega \cdot$cm) consisting of 100 parts of butyl rubber (polysar-butyl), 15 parts of conductive carbon black (Ketjenblack EC), and 250 parts of calcium carbonate was covered with a conductor shield consisting of ethylene-propylene rubber (EPR) and electrically conductive carbon, an insulation layer consisting of EPR, and an insulation shield consisting of EPR and electrically conductive carbon to form a cable core. After the cable core was dried, a water impervious tape was longitudinally applied to it to form a water impervious layer. The water impervious tape consisted of a 50 μm-thick lead foil laminated on both sides with a 100 μm-thick adhesive EEA film. A hold tape of each material as shown in Table 2 below was wound around the structure with a ½ lap. A metal shield layer consisting of a copper wire having a diameter of 1.2 mm was formed around the hold tape layer. A jacket of polyethylene was formed as an outermost layer to provide a 66 kV water impervious ethylene-propylene rubber insulated power cable.

EXAMPLES 8–10

In each of Examples 8 to 10, a watertight stranded conductor, 500 mm² in cross-sectional area, filled with an electrically conductive watertight compound (volume resistivity: $5 \times 10^3$ $\Omega \cdot$cm) consisting of 100 parts of butyl rubber (polysar-butyl), 20 parts of conductive carbon black (Ketjenblack EC), and 150 parts of calcium carbonate was covered with a conductor shield consisting of an ethylene-vinyl acetate copolymer (EVA) and electrically conductive carbon, an insulation layer of polyethylene, and an insulation shield consisting of EVA and electrically conductive carbon to form a cable core. After the cable core was dried, a water impervious tape was longitudinally applied around the cable core to form a water impervious layer. The water impervious tape consisted of a 50 μm-thick lead foil laminated on both sides with a 100 μm-thick adhesive EEA film. Each hold tape of a material as shown in Table 3 below was wound around the structure with a ½ lap. After a metal shield layer comprising a copper wire of 1.2 mm was formed around the hold tape layer, a jacket of polyvinyl chloride was formed as an outermost layer to provide a 66 kV water impervious polyethylene insulated power cable.

TABLE 2

| | | Material | Memory Rate (%) of Expansion and Contraction for Yarn | Weaving Method | Memory Rate (%) of Expansion and Contraction for Woven Fabric | Volume Resistivity ($\Omega \cdot$ cm) of Hold Tape |
|---|---|---|---|---|---|---|
| Example 5 | Warp | Polyester spun yarn | 25 | Plain weave | 20 | $5 \times 10^4$ |
| | Weft | Polyester stretched yarn with crimps | 40 | | 40 | |
| Example 6 | | Electrically conductive butyl rubber was topped on one side of a hold tape in Example 5 to form an electrically conductive butyl rubber layer having a smooth surface (thickness of butyl rubber layer: 0.15 mm). | | | | $5 \times 10^4$ |
| Example 7 | | Graphite powder was applied as a lubricant on one side of a hold tape in Example 1. | | | | $1 \times 10^4$ |

Note.
Each hold tape was made by applying a semiconductive butyl rubber compound solvent solution on both sides of a woven fabric, drying the fabric, and heating and vulcanizing it to impart electrical conductivity.

TABLE 3

|  |  | Material | Memory Rate (%) of Expansion and Contraction for Yarn | Weaving Method | Memory Rate (%) of Expansion and Contraction for woven Fabric | Volume Resistivity ($\Omega \cdot cm$) of Hold Tape |
|---|---|---|---|---|---|---|
| Example 8 | Warp | Polyester spun yarn | 25 | Plain weave | 20 | $1 \times 10^4$ |
|  | Weft | Polybutylene-terephthalate stretched yarn with crimps | 80 |  | 75 |  |
| Example 9 | Warp | Polyester spun yarn | 25 | Twill weave | 30 | $5 \times 10^4$ |
|  | Weft | Polyester stretched yarn with crimps | 40 |  | 45 |  |
| Example 10 | Warp | Polyester stretched yarn with crimps | 40 | Plain weave | 35 | $5 \times 10^4$ |
|  | Weft | Polyester stretched yarn with crimps | 40 |  | 35 |  |

Note.
Each hold tape was made by applying a semiconductive butyl rubber compound solvent solution on both sides of a woven fabric, drying the fabric, and heating and vulcanizing it to impart electrical conductivity.

EXAMPLE 11

Figure 2:
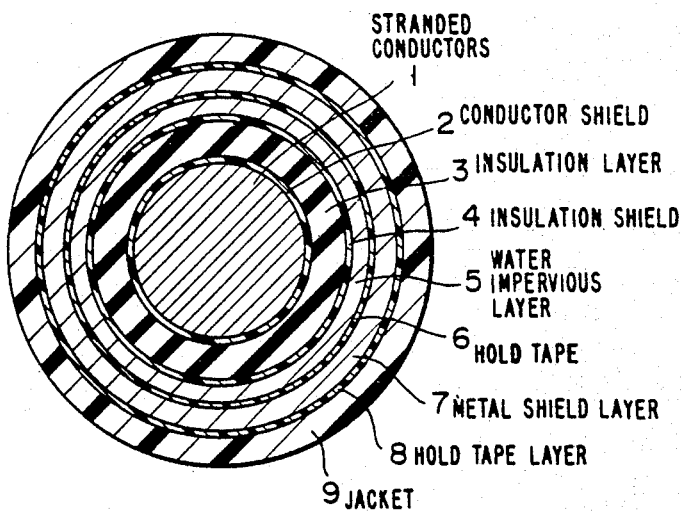
FIG. 2 is a sectional view showing another example of a cable construction according to the present invention.

As shown in FIG. 2, a watertight conductor had stranded conductors 1 of 500 mm² area which were filled with an electrically conductive watertight compound (volume resistivity: $1 \times 10^3$ $\Omega \cdot cm$) consisting of 100 parts of butyl rubber (polysar-butyl), 20 parts of conductive carbon black (Ketjenblack EC), and 100 parts of calcium carbonate. Conductor shield 2 consisting of ethylene-ethyl acrylate copolymer (EEA) and electrically conductive carbon, insulation layer 3 of crosslinked polyethylene, and insulation shield 4 consisting of EEA and electrically conductive carbon were formed around the watertight conductor to provide a cable core. After the cable core was dried at 60° C. to make the amount of methane gas 0.2 cc or less per cc of the crosslinked polyethylene, a water impervious tape was longitudinally applied around the cable core to form water impervious layer 5, which is shown in detail in FIG. 1A. The water impervious tape was a 50 μm-thick lead foil laminated on both sides with a 100 μm-thick adhesive EEA films. Hold tape 6 (shown in detail in FIG. 1B) equal to that of Example 3 shown in Table 1 was wound around the resultant structure with a ½ lap. Metal shield layer 7 comprising a copper tape having a thickness of 0.1 mm and then hold tape layer 8 equal to that of Example 1 shown in Table 1 were formed. Jacket 9 of polyvinyl chloride was formed as an outermost layer to provide 66 kV water impervious crosslinked polyethylene insulated power cable.

The water impervious rubber or plastic insulated power cables in the above Examples and Comparative Examples were subjected to the following test.

The conductor of each power cable was powered and subjected to a heat cycle of a conductor temperature 130° C.⇌R.T. ten times. Thereafter, the cables of each Example and Comparative Example were bent around a test cylinder at room temperature, unwound and the process repeated but this time they were bent in reverse direction. This cycle of operations was performed a total of five, ten and twenty times. Each cable was then disassembled, and the metal shield layer 7, the hold tape layer(s) 6,8), and the water impervious layer 5 of each cable were evaluated in accordance with the evaluation standards shown in Table 4.

TABLE 4

|  | Evaluation | Content |
|---|---|---|
| 1 Metal shield layer | A | No abnormality |
|  | B | Slightly irregular pitch (wire); small wrinkles (tape) |
|  | C | Considerably irregular pitch, folding of copper wire (wire); large wrinkles, cracks, tears (tape) |
| 2 Hold tape layer | A | No abnormality |
|  | B | Small wrinkles, layer shifting |
|  | C | Large wrinkles, layer shifting |
| 2 Water impervious layer | A | No abnormality |
|  | B | Slight degradation |
|  | C | Crazes, cracks, tears |

The results of evaluation are shown in Table 5 below. In practice, if no abnormality is found in the water impervious layer, the hold tape layer, and the metal shield layer after bending 5 cycles along an arc of a diameter 10 times greater than the outer diameter of the cable, the cable is evaluated as being usable for practical applications.

TABLE 5

|  | Water impervious layer | | | Hold tape layer | | | Metal shield layer | | |
|---|---|---|---|---|---|---|---|---|---|
|  | No. of Bending Operations | | | | | | | | |
|  | 5 | 10 | 20 | 5 | 10 | 20 | 5 | 10 | 20 |
| Example 1 | A | A | B | A | B | C | A | B | C |
| Example 2 | A | A | A | A | A | B | A | A | B |
| Example 3 | A | A | A | A | A | A | A | A | A |
| Example 4 | A | A | A | A | A | A | A | A | A |
| Example 5 | A | A | B | A | B | C | A | B | C |
| Example 6 | A | A | A | A | A | B | A | A | B |
| Example 7 | A | A | A | A | A | B | A | A | B |
| Example 8 | A | A | B | A | B | C | A | B | C |
| Example 9 | A | A | B | A | B | C | A | B | C |
| Example 10 | A | A | B | A | B | C | A | B | C |
| Example 11 | A | A | A | A | A | A | A | A | B |

TABLE 5-continued

| | Water impervious layer | | | Hold tape layer | | | Metal shield layer | | |
|---|---|---|---|---|---|---|---|---|---|
| | No. of Bending Operations | | | | | | | | |
| | 5 | 10 | 20 | 5 | 10 | 20 | 5 | 10 | 20 |
| Comparative Example 1 | C | | | C | | | C | | |
| Comparative Example 2 | C | | | C | | | C | | |
| Comparative Example 3 | B | C | | C | | | C | | |
| Comparative Example 4 | B | C | | C | | | C | | |

What is claimed is:

1. A water impervious rubber or plastic insulated power cable, comprising:
   a cable core;
   a water impervious layer formed around said cable core, said water impervious layer comprising a laminated tape which includes a metal foil and an electrically conductive plastic film; and
   a hold tape layer formed on said water impervious layer, said hold tape layer having an excellent expanding property to follow a heat cycle of the power cable;
   said hold tape layer comprising a tape comprising a synthetic resin fiber cloth and an electrically conductive rubber layer, said synthetic resin fiber cloth having a memory rate of expansion and contraction (A) of at least 30% in at least one of the transverse and longitudinal directions of said tape, said memory rate of expansion and contraction (A) being given by:

$$A(\%) = (a-b)/a \times 100$$

where,
   a = hank (mm) in the case of applying a load of 2/1000 gf×20 number per 1d of the indicated denier and another load of 1/10 gf×20 number per 1d of the indicated denier; and
   b = hank (mm) in the case of applying a load of 2/1000 gf×20 number per 1d of the indicated denier.

2. The water impervious power cable of claim 1, wherein said hold tape layer is in direct contact with said laminated tape of said water impervious layer.

3. The water impervious power cable of claim 1, wherein:
   said synthetic resin fiber cloth serves as a base cloth of said hold tape layer;
   said electrically conductive rubber layer of said hold tape layer is formed on said base cloth; and
   said base cloth is formed of woven filament yarn, at least part of said woven filament yarn having small crimps therein to impart said memory rate of expansion and contraction of at least 30% to said woven filament yarn.

4. The water impervious power cable of claim 1, wherein:
   said synthetic resin fiber cloth serves as a base cloth of said hold tape layer;
   said electrically conductive rubber layer of said hold tape layer is formed on said base cloth; and
   said base cloth is formed of a filament fiber, at least part of said filament fiber having small crimps therein to impart said memory rate of expansion and contraction of at least 30% to said filament fiber.

5. The water impervious power cable of claim 1, wherein said synthetic resin fiber cloth is made from a filament fiber, said filament fiber being a synthetic resin fiber selected from the group consisting of fiber of nylon, polyester, polybutylene-terephthalate, polyurethane, and polypropylene.

6. The water impervious power cable of claim 1, wherein said electrically conductive rubber layer of said hold tape layer is formed on at least one side of said synthetic resin fiber cloth.

7. The water impervious power cable of claim 1, wherein said synthetic resin fiber cloth is made from a filament yarn, said filament yarn being a synthetic resin fiber selected from the group consisting of fiber of nylon, polyester, polybutylene-terephthalate, polyurethane, and polypropylene.

8. The water impervious power cable of claim 1, wherein:
   said electrically conductive plastic film of said laminated tape of said water impervious layer comprises an electrically conductive polyolefin film; and
   said metal foil of said laminated tape of said water impervious layer comprises a foil of a metal selected from the group consisting of lead, copper and aluminum.

9. The water impervious power cable of claim 1, wherein:
   said electrically conductive plastic film of said laminated tape of said water impervious layer comprises an electrically conductive polyolefin film; and
   said metal foil of said laminated tape of said water impervious layer comprises a lead or lead alloy foil having a thickness of 20 to 200 μm;
   said electrically conductive polyolefin film being bonded on at least one side of said metal foil.

10. The water impervious power cable of claim 1, wherein said hold tape layer has a volume resistivity of not more than $5 \times 10^6$ Ω·cm.

11. The water impervious power cable of claim 1, wherein said cable core comprises an insulation layer comprised of a material selected from the group consisting of crosslinked polyethylene, polyethylene, and ethylene-propylene rubber.

12. The water impervious power cable of claim 1, wherein said cable core comprises a conductor shield and a rubber or plastic insulation layer which are sequentially formed around a conductor.

13. The water impervious power cable of claim 1, wherein said cable core comprises a conductor shield, a rubber or plastic insulation layer, and an insulation shield which are sequentially formed around a conductor.

14. The water impervious power cable of claim 1, further comprising a metal shield layer around said hold tape layer.

15. The water impervious power cable of claim 14, further comprising a jacket layer around said metal shield layer.

16. The water impervious power cable of claim 1, wherein said cable core comprises a watertight cable conductor, said watertight cable conductor comprising a plurality of stranded conductors, gaps between said stranded conductors being filled with an electrically conductive watertight compound.

* * * * *

UNITED STATES PATENT AND TRADEMARK OFFICE
CERTIFICATE OF CORRECTION

PATENT NO. : 4,703,134
DATED : October 27, 1987
INVENTOR(S) : UEMATSU

It is certified that error appears in the above-identified patent and that said Letters Patent is hereby corrected as shown below:

Title page, left-hand column, the Assignee identified as "Furukawa Electric Co., Ltd." should be -- The Furukawa Electric Co., Ltd. --.

Signed and Sealed this

Thirty-first Day of May, 1988

Attest:

DONALD J. QUIGG

Attesting Officer

Commissioner of Patents and Trademarks